April 29, 1958 — R. B. SAALFRANK — 2,832,296
SUBMERSION PUMPS
Filed Oct. 28, 1954 — 6 Sheets-Sheet 1

April 29, 1958  R. B. SAALFRANK  2,832,296
SUBMERSION PUMPS

Filed Oct. 28, 1954  6 Sheets-Sheet 2

United States Patent Office 2,832,296
Patented Apr. 29, 1958

2,832,296

SUBMERSION PUMPS

Royal Bartlett Saalfrank, Gulfport, Fla., assignor to Milton Roy Company, Philadelphia, Pa., a corporation of Pennsylvania Application October 28, 1954, Serial No. 465,307

5 Claims. (Cl. 103—153)

This invention relates to submersion pumps and has for an object the provision of a rugged, durable pump of the controlled volume type which can be operated completely submerged in the liquid being pumped and which will deliver a metered flow thereof.

While pumps have been designed for applications in deep wells, and while sump pumps are well known for use in submerged locations, such pumps are, in general, not capable of precise pumping of liquids, for example, a metered flow accurate to within 1% or better.

In accordance with the present invention there is provided not only a submersion type of pump useful in all applications where leakage of corrosive or expensive fluids cannot be allowed, but also which produces a metered flow of such liquids to accuracies in general better than 1%. Further in accordance with the invention, the pump together with its associated components including the supporting structure is of exceedingly compact design and of minimum weight for the particular duty involved. While the pumping assembly as a whole may be submerged in tank cars, vats and the like, the pump is adapted for operation in an exceedingly small container which serves itself as a supply tank for the inlet to the pump. Such an arrangement is of particular advantage when the needed storage in the vicinity of the pump is to be minimized.

In one form of the invention, a combined valve and cylinder block provides a guiding or bearing surface for an elongated actuating means and also cooperates with the supporting means for operation of the pump at any desired subsurface level. The cylinder block has a cylinder closed at the upper end and extending downwardly to receive a vertically moving plunger. By reason of the plunger-displacement of liquid from the cylinder, there is attained a metered flow of liquid through the outlet passage. The inlet to the cylinder includes series-connected ball valves spaced circumferentially of the cylinder, and the outlet passage includes serially connected ball valves also spaced circumferentially of the cylinder. The inlet passage terminates at the uppermost portion of the cylinder, and the interconnecting passageways within the cylinder block are inclined upwardly in avoidance of any possibility of air entrapment in any portion of the pumping assembly.

The upward movement of the plunger during the working stroke is opposed by one or more structural members disposed symmetrically with respect to the central axis of the plunger. Thus there is avoided or minimized to a negligible degree any lateral forces which would tend to cause flexure of the structural supporting members during the pressure or working stroke of the plunger. By reason of the foregoing features and those later to be described, liquid may be metered by the direct volumetric plunger displacement to any limits of accuracy by submersible type pumps made in accordance with the present invention.

For further objects and advantages of the invention and for a more detailed description of the construction and manner of operation thereof, reference should now be had to the following detailed description taken in conjunction with the accompanying drawings, in which:

Figures 1, 4, 8:
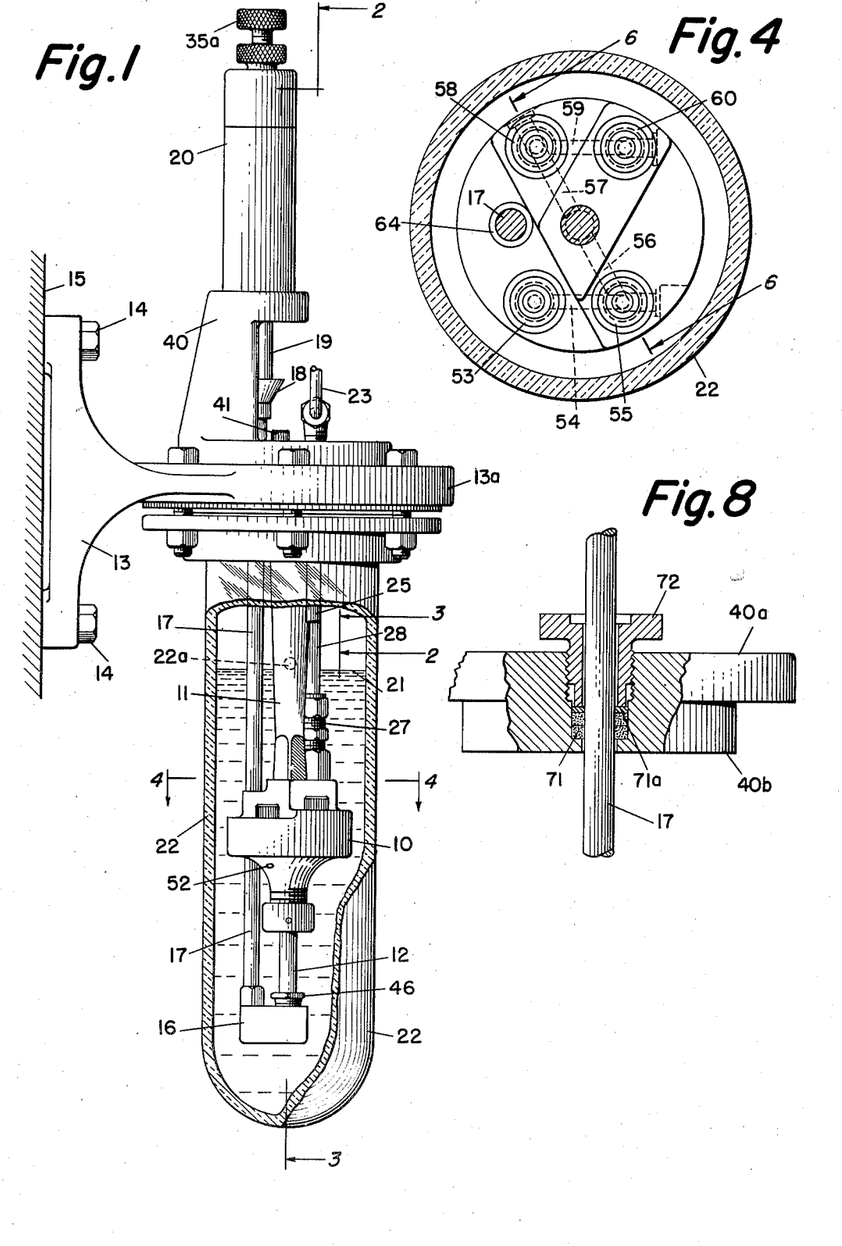
Fig. 1 is a side elevation, partly in section, of one embodiment of the invention.
Fig. 4 is a sectional elevation taken on the line 4—4 of Fig. 1.
Figs. 7 and 8 are sectional elevations of modifications or attachments adapted for use with either the pump of Figs. 1–6 or the pump of Figs. 10–14.

Referring now to Fig. 1, the combined valve and cylinder block 10 is supported by a single structural member 11 suitably secured to the valve block 10 in coaxial alignment with the plunger 12 of the pump. The member 11, Fig. 2, at its upper end abuts against the lower flange 40b of bracket 40 and is held in place by a screw (not shown) extending through flanges 40a and 40b and into member 11. The upper, larger flange 40a rests on an cantilever support secured as by bolts 14 to a stationary support 15. The plunger 12 through a horizontally extending connecting member 16 is actuated by a vertical rod 17. The rod 17 slidably extends through bearing means provided in the block 10. Through a floating driving connection 18, rod 17 is secured to the lower end of an actuating rod 19 driven by a pneumatic actuator 20.

In the form of the invention illustrated in Figs. 1–6 and 9, only a small volume of liquid surrounds the pumping assembly, the liquid level 21 being shown somewhat below the supporting flange 13a and within a suitable container wall 22 which may be made of glass, stainless steel, or any suitable material chemically inert to the liquid to be delivered at a predetermined metered rate.

Figures 2, 7, 9:
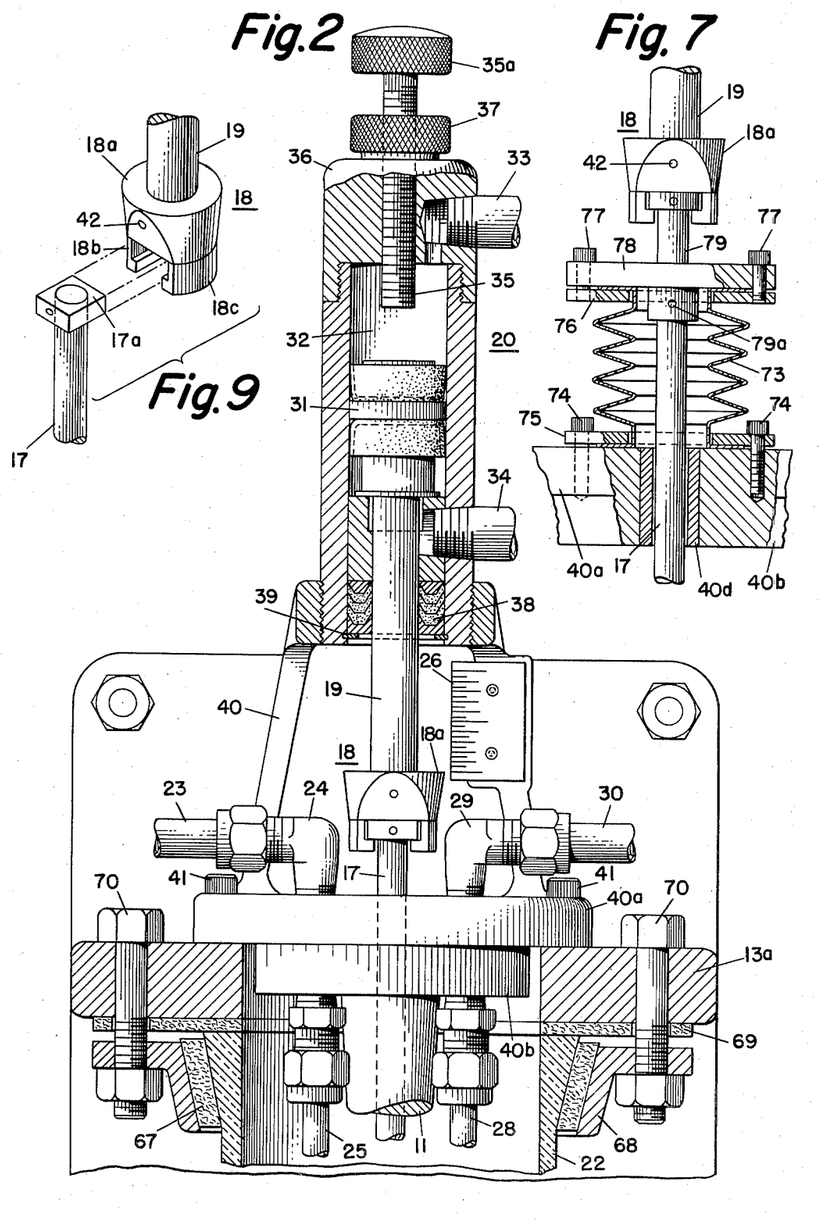
Fig. 2 is an enlarged front elevation, partly in section, of the pump of Fig. 1 taken on the line 2—2.
Fig. 9 is an exploded perspective view showing the attachment of the actuating rod to the actuator.
Figures 3, 3A:
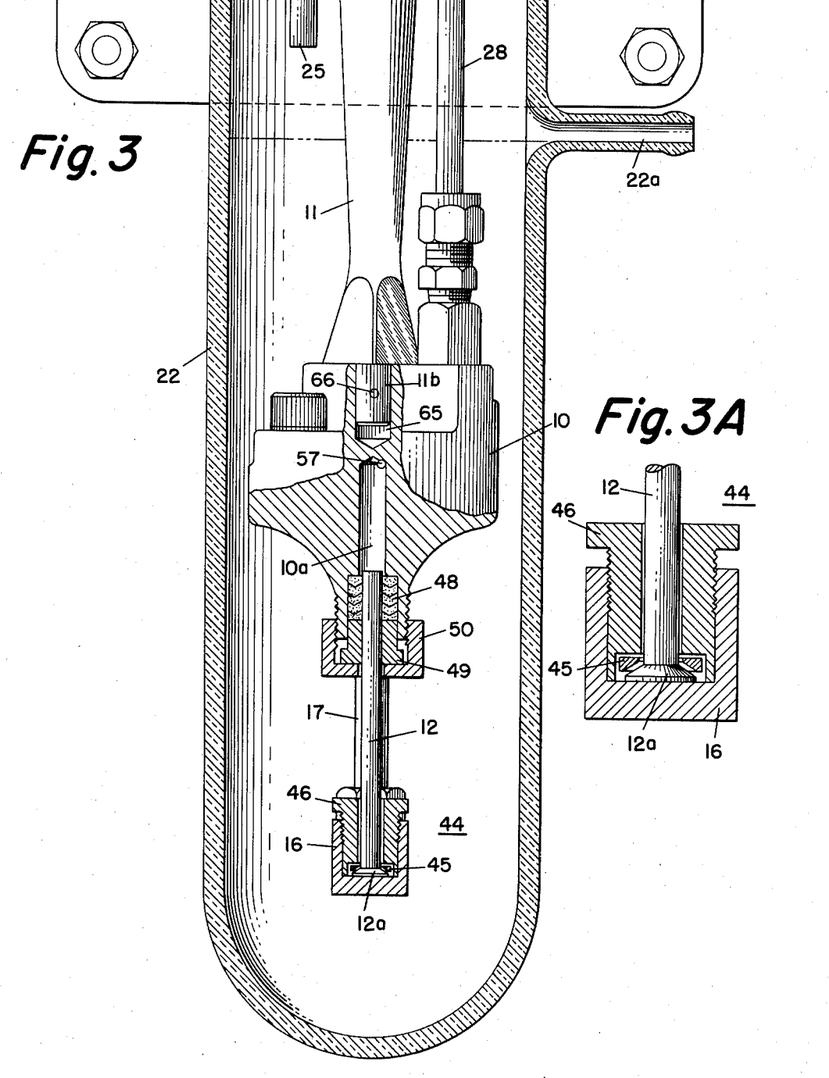
Fig. 3 is a sectional elevation of the lower half of the pump of Fig. 1 taken on the line 3—3 thereof.
Fig. 3A is an enlarged view of the lower end of the plunger and associated structure.

As best shown in Fig. 2, the liquid to be pumped is introduced into the container 22 through a supply pipe 23 connected through the couplings and elbow 24 to the inlet pipe 25 which, as shown in Fig. 3, extends but a short distance into the container 22. The outlet passage, Fig. 1, extends by way of couplings 27, pipe 28 and by way of the additional couplings and elbow 29, Fig. 2, to the outlet or discharge pipe 30.

Figures 10, 12, 13, 14:
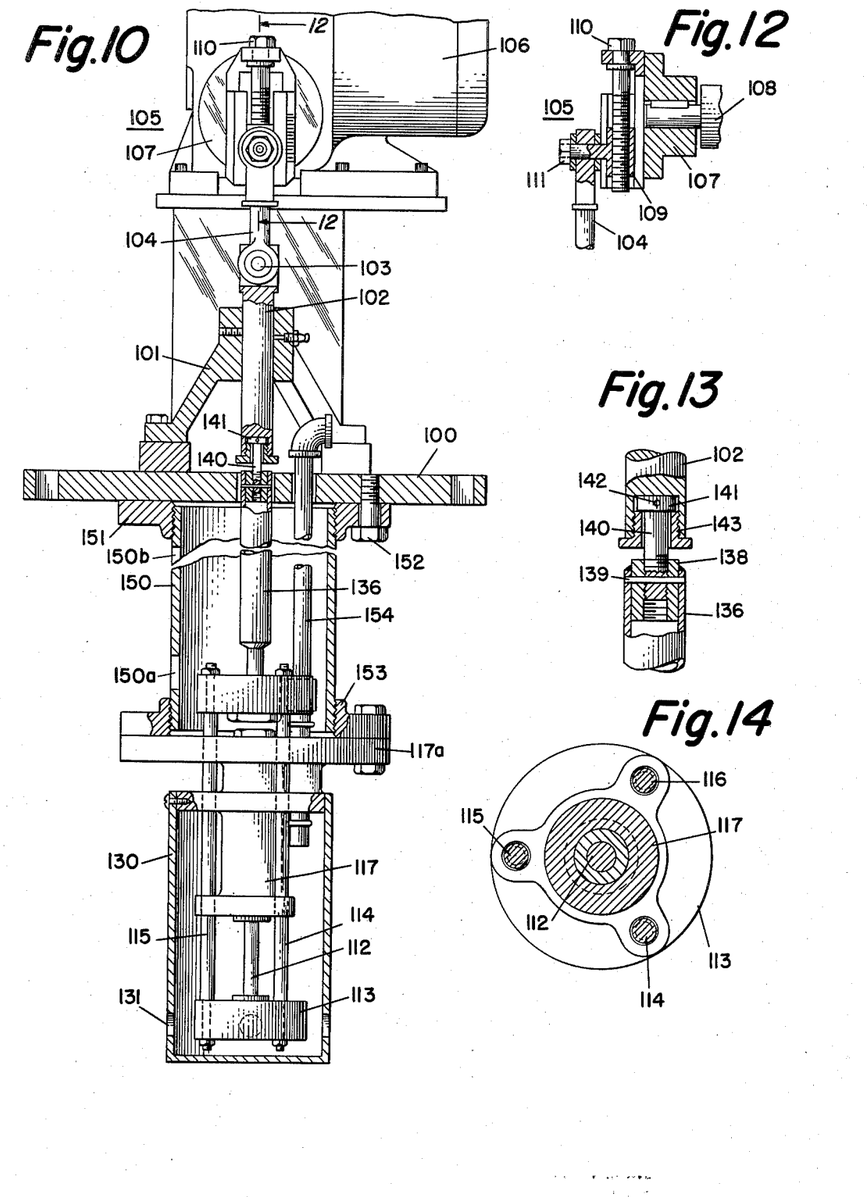
Fig. 10 is a side elevation, partly in section, of a modified pump embodying the present invention.
Fig. 12 is a fractional sectional view taken on the line 12—12 of Fig. 10.
Fig. 13 is an enlarged sectional view of the connection between the actuator and the actuating rod.
Fig. 14 is a sectional view taken on the line 14—14 of Fig. 11.

The rate of flow of liquid through the outlet pipe 30 will be determined by the length of the stroke and the number of strokes per unit of time. Actuating means of any conventional type with an adjustable stroke mechanism may be utilized to drive the plunger. One form of a suitable actuating means of the mechanical type is shown in Figs. 10 and 12. The pneumatic actuating device 20, as best shown in Fig. 2, comprises a piston 31 including conventional cup-shaped packing elements disposed for reciprocation within the cylinder 32 as determined by the application of air pressure through the air lines 33 and 34. The parts in Figs. 2 and 3 are illustrated with the piston 31 in its lowermost position corresponding with the completion of the return stroke of the plunger 12. Upon admission of compressed air through the line 34, the piston 31 initiates the upward and working stroke of plunger 12. The length of that stroke is determined by the position of a stop member 35 threaded into the endcap 36 and held in place by a lock nut 37. The upper end of the stop member 35 is provided with a knurled head 35a for convenient adjustment of the stroke of the piston and of the plunger of the pump. It is to be understood that the admission of compressed air to the pipes 33 and 34 will be controlled by suitable and conventional valve means, which for simplicity has not been illustrated. Any suitable pneumatic actuator may be utilized, the one illustrated including other conventional provisions, such as the packing means 38 which provides a seal around the reciprocating actuator 19. The packing assembly is retained in place by a locking ring 39.

As shown in Fig. 1, the pneumatic actuator 20 is carried by a bracket 40 secured to the flange 13a as by cap screws 41, best shown in Fig. 2. The bracket 40 and pneumatic actuator 20, Fig. 1, are located to one side of the centrally disposed structural member 11 and in such a position that the axis of the pneumatic actuator and its rod 19 is coextensive with the axis of the actuating rod 17. To take care of any radial displacement as between rods 17 and 19, the floating driving connection 18 is provided. As best shown in Fig. 9, the rod 19 has secured to its lower end as by pin 42 a member 18a having two legs 18b and 18c with portions spaced inwardly from the lower ends thereof cut away to form a guideway within which a square end-member 17a may be disposed. The end-member 17a is pinned to the rod 17. The end-member 17a has a dimension laterally of the guideways slightly less than their spacing to provide a slight range of movement therebetween. Thus, there can be relative movement in any direction as between rods 17 and 19. During the pressure stroke of the pump there is thus avoided any lateral forces on the pumping assembly as might otherwise be communicated thereto through the rod 17. The upper edge of member 18a serves as an index for the stroke-indicating scale 26.

Further to minimize the development of the lateral forces there is provided a second floating driving connection 44 between the connecting member 16 and the pump plunger 12. As best shown in Figs. 3 and 3A, the plunger 12 has an enlarged lower end with a tapered conical surface against which rests a mating ring 45 to form with the tapered surface 12a a roughly rectangular bearing assembly. A clamping nut 46 is counterbored to form a bottom recess of somewhat larger dimensions than the assembly including the ring 45. Thus, with the nut 46 threaded into the connecting member 16 and with the rim thereof seated against the bottom of the opening in member 16, there will be freedom of movement to a limited degree in all radial directions as between the rod 12 and its enlarged head and the connecting member 16. To show this freedom of movement, the clearances have been exaggerated.

By reason of the foregoing floating driving connections and the driving system as a whole, the actuating forces are applied coaxially of the plunger 12 and the cylinder 10a in which it is disposed. There is thus avoided the application to the plunger 12 of any forces radially of, or laterally, with respect thereto. The forces alternately applied to the plunger act vertically upward and vertically downward. As shown in Fig. 3, the plunger 12 is in its lowermost position. If lateral forces tended to deflect plunger 12, as for example, about an axis located in the vicinity of the lower end thereof, any such deflection would be greatly magnified in the region of a packing assembly 48 held in place by a packing member 49 and the gland nut 50. By avoiding such lateral movement of the end of the plunger, there is minimized any wear on the packing assembly 48 and leakage of liquid under pressure is minimized and, in general, entirely avoided.

The pump itself functions accurately to meter or control the flow of liquid by reason of the direct volumetric displacement of liquid caused by the upward movement of the plunger 12 within the cylinder 10a. It is preferred that the plunger 12 have substantial clearance with the wall of the cylinder 10a. The accuracy and metering of the liquid is not in any way dependent upon a tight fit between the plunger and the cylinder wall.

There will now be considered the flow of liquid, beginning with the suction stroke of the plunger 12 after completion of the working stroke. With the foregoing assumption in mind, the plunger 12, Fig. 3, will be in its uppermost position adjacent a passageway in the valve and cylinder block 10. It will be further assumed that the plunger 12 is moving downwardly. By reason of the positive head on an inlet opening 52, Fig. 1, as well as the suction produced by the downward movement of plunger 12, the cylinder 10a is maintained full of liquid. As best shown in the enlarged phantom view of Fig. 5, the inlet 52 represents the end of a passageway extending upwardly into the valve and cylinder body 10. At a lower level 10b, the block 10 is counterbored to receive a ball valve assembly 53. On the discharge side of the ball valve of assembly 53 there extends a flow passage 54 terminating on the lower side of a second ball valve assembly 55. It is to be understood that each of the ball valve assemblies are of identical construction, the assemblies 55 and 58 being shown in detail in the enlarged sectional view of Fig. 6.

Figures 5, 6:
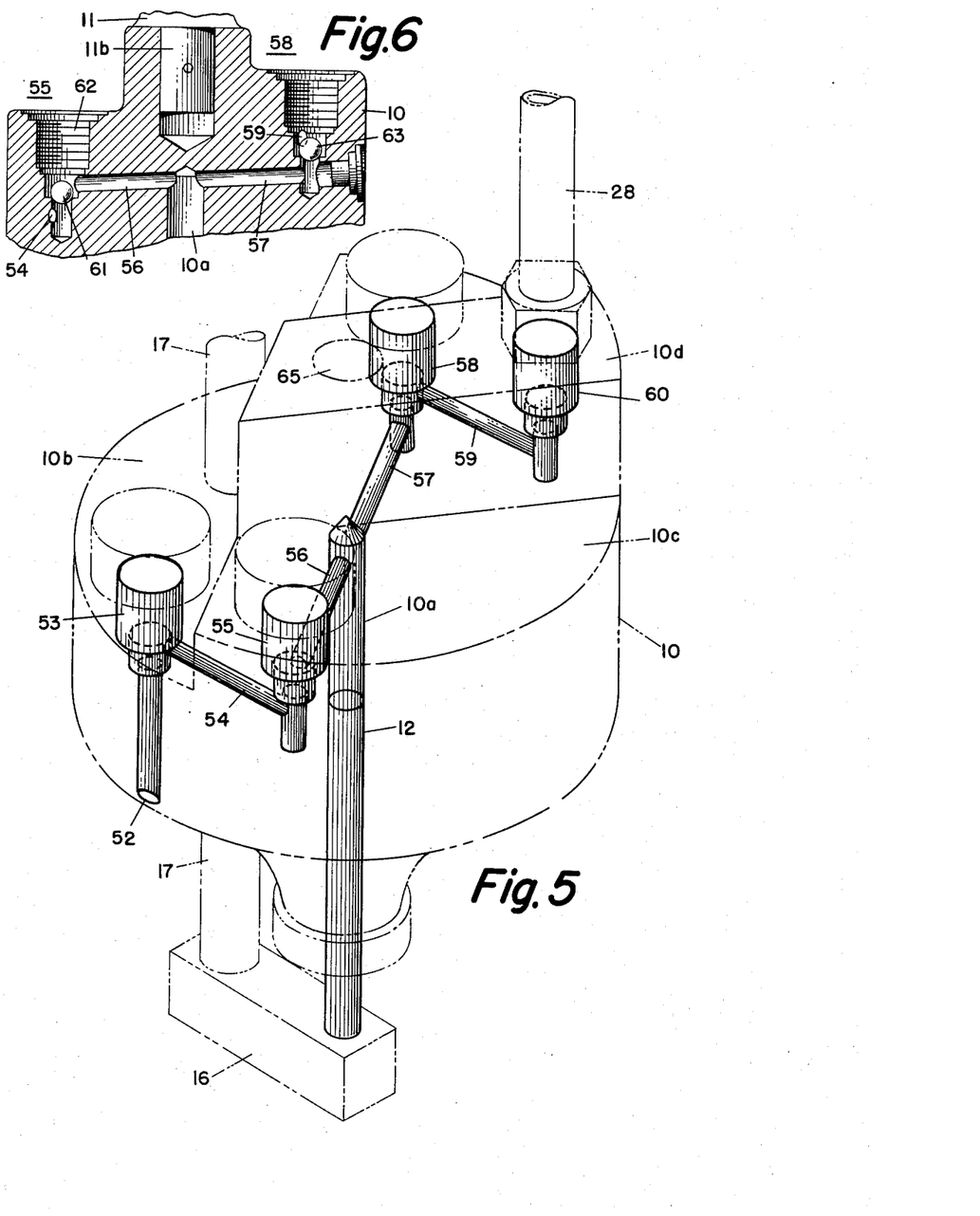
Fig. 5 is a perspective view of the combined valve and cylinder block.
Fig. 6 is a sectional view taken on the line 6—6 of Fig. 4.

In Fig. 6 the end of passageway 54 will be seen just below a ball 61 resting upon a valve seat which is illustrated as formed integral with the block 10, but which may be in the form of an insert. The enlarged opening 62 is threaded to receive a cap, the lower end of which forms a stop, and preferably a cage, to retain the ball 61 generally coaxial with the valve seat. The ball 63 of the assembly 58 is shown resting on the valve seat and closing the discharge passage.

Returning now to Figs. 3 and 5, as the plunger 12 moves downwardly within the cylinder or plunger chamber 10a, liquid under positive pressure due to the level thereof in the container 22 well above the entrance 52 and due to the suction of the plunger 12, flows upwardly toward the ball valve. The ball forming a part of the assembly 53 rises for free flow of liquid into passage 54 in the same manner as ball 61, which rises for free flow of liquid through the valve assembly 55 and into a flow passage 56 which communicates with the uppermost portion of the cylinder 10a. As the balls are lifted from their respective seats, they are rotated, and thus there is minimized any retention on their surfaces of solids or impurities which might prevent tight seals upon return of the balls to their lowermost valve-closing positions.

During the foregoing suction stroke the ball 63 of assembly 58 has tightly sealed passageway 59, and the ball in valve assembly 60 has tightly sealed the outlet passage 28 against reverse flow.

Assuming now that the suction stroke has been completed, the cylinder 10a will again have a predetermined volume of liquid therein. That volume is predetermined by the setting of the stroke-adjusting knob 35a, Figs. 1 and 2. It will now be assumed the plunger 12 has begun its upward pressure stroke. As it moves upwardly, it displaces a volume of liquid equal to its own volume. The resultant pressure within cylinder 10a is applied through a flow passage 57, the open mouth of which can be seen in Fig. 3. The moving stream of liquid in passage 57 lifts the ball of assembly 58 from the position shown in Fig. 6, and the flow of liquid through passage 59 lifts the ball of assembly 60 for flow of the liquid upwardly through the exit or discharge pipe 28.

It is to be noted that the passage 52 rises to the valve assembly 53; that the passage 54 is inclined upwardly from a region below the lower level 10b and into the underside of the ball assembly 55. The passage 56 is likewise inclined upwardly to intersect the cylinder 10a at the uppermost end thereof. Thus, should any bubbles appear within the flowing liquid, there is no chance of entrapment thereof. These bubbles all find free passageway into the upper end of the cylinder 10a. Air is not trapped within the cylinder due to the fact the passageway 57 intersects it at the upper end thereof and is also inclined upwardly from the region of a second level 10c of block 10 to the lower portion of valve assembly 58. Similarly, passageway 59 is inclined upwardly to the lower portion of valve assembly 60. Thus, any bubbles of air flow directly through the system. None remains to impair the accuracy of the pump such as might occur if there were possibility of air-entrapment within the liquid end of the pump. The discharge pipe 28 is secured to the upper level 10d of block 10 by means of a conventional fitting.

From the foregoing, it will be seen that the valve assemblies 53, 55, 58 and 60 are circumferentially spaced around the cylinder 10a with upwardly inclined flow connections between them. In addition to the several functions performed by the combined valve and cylinder block 10, the actuating rod 17 is, in its vertical movement, guided thereby. As shown in Fig. 4, a bronze bushing 64 provides a bearing surface for the reciprocatory movement of rod 17.

As best shown in Figs. 3, 4 and 5, the block 10 includes an opening 65 extending from the upper surface downwardly in coaxial relation with respect to the cylinder 10a. Into the opening 65 is disposed the lower end 11b of the supporting member 11, the lower reduced end 11b being secured to the body 10 as by a pin 66. Adjacent the reduced end 11b the member 11 is outwardly flared to provide a relatively large shoulder area for the upper face of the valve and cylinder body. The member 11 from its smallest cross-sectional area gradually increases in cross-sectional area to its upper end. While the supporting member 11 preferably has the configuration illustrated, it will be understood that it may be of any configuration. It can be cylindrical or rod-like in form, or square, and of uniform cross-sectional area. It is important that the supporting means 11 shall symmetrically support the block 10 so that upon the upward pressure stroke of plunger 12, there will be lacking any tendency of lateral movement of the block 10 relative to plunger 12. As will later be explained in connection with Figs. 11–14, the foregoing requirements also can be met by rod-like means symmetrically disposed about the axis of cylinder 10a. With such a structure in mind, it will be seen that the supporting means comprising member 11 is symmetrically located with respect to the longitudinal axis of cylinder 10a.

In either embodiment of the invention, it is to be observed that the actuating rod 17 is not only guided by the valve and cylinder block 10, but also by a guiding or bearing surface provided in the flange portion of bracket 40. Such a bearing surface is shown in Fig. 7 as provided by the bronze sleeve 40d. Since the block 10 and the flange portions 40a and 40b are rigidly secured together by the common member 11, the guiding and bearing surfaces for rod 17 are always maintained in alignment and further minimize the development of lateral forces on the pumping assembly as a whole.

While the flow of the liquid to be pumped may be regulated so as to maintain the liquid level 21 adequately above the inlet opening 52, there has been shown in Fig. 3 an outlet 22a to which suitable connection may be made, either to drain, or preferably and more likely, to a storage container, or for return to the inlet pipe 23.

As already mentioned, the container 22 is not essential to the invention. A pump made in accordance therewith can be operated in the absence of a container by lowering it to any desired subsurface level for immediate flow of liquid. Where a container is used and is constructed of glass or other ceramic material, the upper end may terminate in an outwardly flaring flange, as shown in Fig. 2. By means of a flexible or resilient gasket 67 and a clamping member 68, the upper end of the container 22 may be pressed tightly against a gasket 69 located against the lower face of the flange 13a, a series of tightening bolts 70 being provided for the foregoing purposes. Thus the clamping member 68 in conjunction with the bolts 70 not only assures a tight seal at the upper end of the container, but also supports it against any lateral movement thereof.

Where it is desired to provide a seal against ingress of moisture, vapor, gases and the like, and also to prevent egress of vapors or gases from container 22, it is only necessary to provide sealing means around the actuating rod 17. As shown in Fig. 8, instead of the bronze bushing or other guiding means on the upper flange 11a of member 11, there may be included packing means 71 resting against the bottom wall of a recess closed by a gland nut 72, the lower end of which bears against a metal ring 71a. Where a packing assembly, such as in Fig. 8, is not deemed adequate, the modification of Fig. 7 may be utilized. In Fig. 7 the flange 40a includes a bronze bushing 40d which guides the upper end of rod 17. The lower end of a bellows 73 is by the cap screws 74 and the clamping ring 75 clamped to the upper face of flange 40a. Similarly, the upper end of bellows 73 is by a clamping ring 76 and cap screws 77 clamped to a member 78 which is secured to the lower end of a member 79 interposed between the floating connection 18 and the rod 17. The member 79 is secured to rod 17 as by a pin 79a. The bellows 73 may be formed of any suitable material which will be resistant to the vapors of the liquid being pumped. For some applications, the bellows 73 has been made of a fluorocarbon resin sold under the trade-name of "Teflon" and otherwise known as polytetrafluoroethylene.

Referring now to the modification of Figs. 10–14, a supporting plate 100 takes the place of the cantilever support 13 and the flange 13a of the earlier modification. The supporting plate 100 may be circular and have dimensions the same as a manhole or other cover for a tank or vessel from which liquid is to be delivered in metered flow. Extending upwardly from bosses on plate 100 is a bracket 101 having an opening through the upper portion through which there slidably extends a drive rod 102 whose upper end is pivotally connected at 103 to the actuating rod 104 of an adjustable stroke mechanism 105. The drive for the pump is derived from a motor 106 which through suitable reduction gearing rotates an eccentric driving member 107, Fig. 12, which is keyed to the drive shaft 108 and which is provided with guideways within which there is slidably mounted a motion-transmitting member 109 adjustable lengthwise of the guideways by a threaded adjusting screw 110. Extending outwardly from the member 109 is a driving arm on which is pivotally mounted the upper end of actuating member 104, a nut 111 and washers being provided to complete the assembly. By rotating the adjusting screw 110, the member 109 may be raised or lowered in the guideways to change the length of the stroke and, thus, the amount of liquid displaced during each upward and pressure stroke of the plunger 112. The plunger 112 is actuated through a lower driving member 113 carried by and secured to three rods 114, 115 and 116, each of the rods having shoulders and having nuts threaded on the lower ends to hold the member 13 solidly against the shoulders. The rods 114–116 extend upwardly through guide openings within the valve and cylinder block 117, there being three sets of guide openings for each rod, the openings 118—120 being shown in Fig. 11 for the rod 115. The rod-actuating means 114—116 is symmetrical about the longitudinal axis of the plunger 112 and the cylinder 121 within which it vertically moves.

Figure 11:
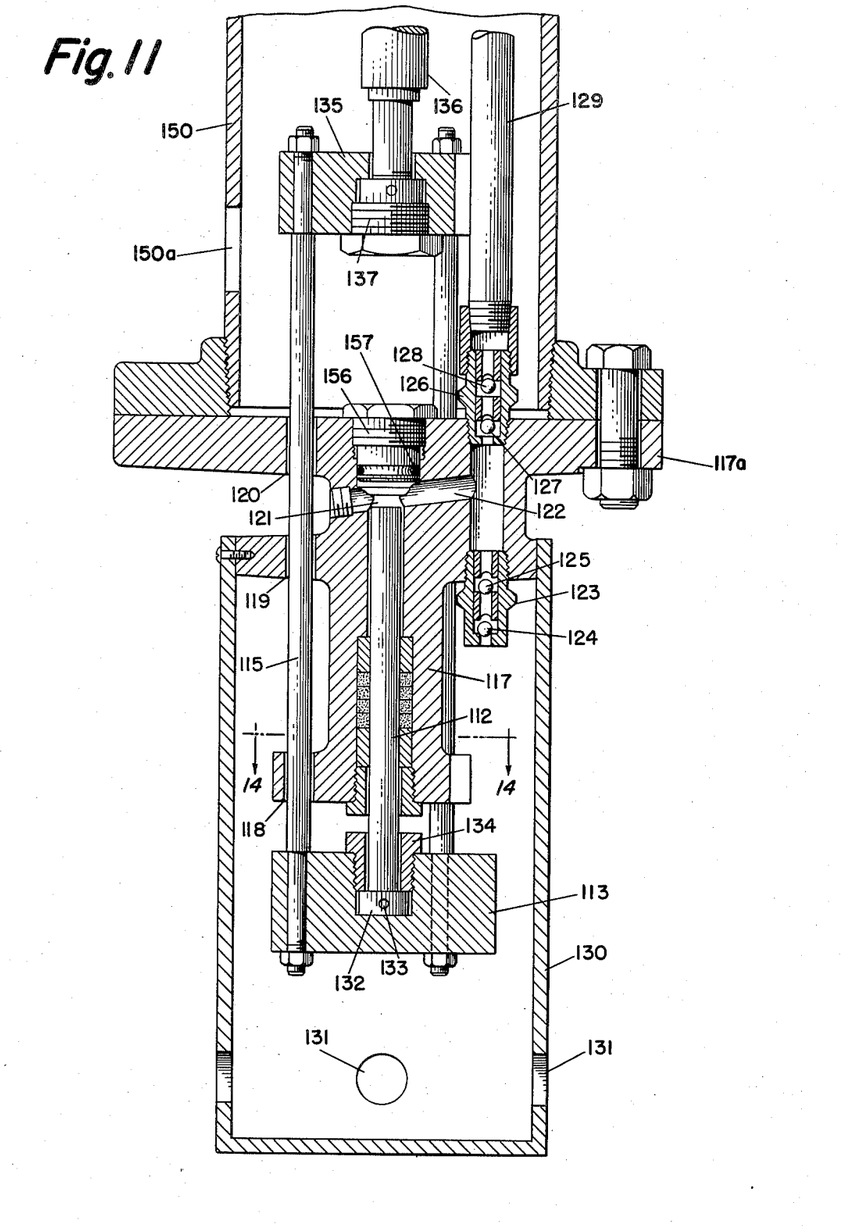
Fig. 11 is an enlarged sectional view of the lower portion of the pump of Fig. 10.

The valve and cylinder body 117, as best shown in Fig. 11, differs somewhat in configuration from the earlier modification, but it retains the feature of an inclined passageway 122 which intersects the cylinder 121 at the upper portion thereof. The inlet valve means 123 includes two ball valves, the lower balls 124 and 125 being included in a single element or assembly 123 threaded into the block 117. Thus, the inlet passage extends vertically upward and into communication with the inclined passageway 122. The outlet valve assembly 126 includes balls 127 and 128, the exit passageway 129 also extending vertically upward. Thus, as the plunger 112 is moved downwardly from its illustrated position, liquid entering a lower housing 130, as through a series of openings 131, flows past the ball valves 124 and 125, and thence into the cylinder 121. After completion of the downward stroke, the plunger 112 is moved upwardly. The balls 124 and 125 move to their downward position to close the inlet passage and the balls 127 and 128 move upwardly for free flow of liquid outwardly through the passage 129. A floating driving assembly for the plunger 112 is provided and comprises an enlarged head 132 secured by pin 133 to the plunger and movable to limited extent in the recess of driving member 113, the opening being partly closed by a threaded bushing 134. Suitable packing is provided about the plunger 112 in manner similar to that described in the previous modification.

The rods 114—116 terminate in a driving member 135 which receives centrally thereof and coaxially with plunger 112 and cylinder 121 an intermediate driving member 136. A floating driving connection 137 identical in construction with that provided for the lower end of plunger 112 permits slight lateral or radial movement in any direction of member 136 relative to member 135. The connection of the upper end of driving member 136 with the lower end of driving member or rod 102 is best shown in Fig. 13. The driving member 136 is shown as a tube or cylinder having a threaded insert 138 secured therein as by a pin 139. A coupling member 140 has an enlarged head 141 secured as by pin 142 to a recess in the lower end of rod 102, a clamping nut 143 being provided for the same purposes as like clamping nuts previously described.

The advantages of the modification of Figs. 11–14 include the lack of any limitation upon the location of the pumping assembly relative to the driving mechanism. More particularly, an intermediate housing 150 having its upper end threaded into a flange 151 secured as by bolts 152 to the supporting member 100 may be quite long. The lower end of intermediate housing 150 is threaded into a coupling member 153 which is in turn bolted to the upper and outwardly flaring flange 117a of valve or cylinder body 117. Thus, the cylindrical driving member 136 and the outlet pipe 154 may be varied in length to locate the pumping mechanism adjacent the bottom of a vessel of any depth. When so located, the intermediate housing 150 forms an adequately rugged supporting means concentric with the axis of the driving member 136 and the axis of the plunger 112 and its cylinder 121. Thus, there is avoided the appearance of lateral forces tending to deflect the plunger 112 to the detriment of the packing and the pumping accuracy of the pump as a whole. The lower housing 130 provides a volume of relatively quiescent liquid and thus avoids agitation of any foreign material which might accumulate at the bottom of a large tank of liquid. The openings 131 are numerous enough for the desired maximum flow and small enough to prevent ingress of undesired solids.

Now that the two modifications have been explained in detail, it will be understood that many changes may be made within the scope of the claims appended hereto. For example, the valve arrangements of the first modification could be utilized in the second modification, and vice versa, with suitable re-design of the valve and cylinder bodies. In Fig. 11 the body 117 could be counterbored from the lower end, although as shown, the cylinder 121 is closed at its upper end by a plug 156 having an enlarged upper end threaded into the block 117. A reduced lower end of the plug 156 has a groove in which there is disposed a sealing ring 157.

While reference has been made to tubular member 150 as a housing, its more important function is to support the pumping assembly at a selected subsurface location in a vessel of liquid. To avoid resistance to movement by the liquid within tubular member 150, windows 150a and 150b are provided, preferably near the extremities thereof.

What is claimed is:

1. In a submersion pump of the controlled volume type adapted for operation below the level of a body of liquid, the combination of a cylinder block having a vertically extending plunger chamber, an elongated plunger disposed for reciprocation within said chamber, the lower end portion of said plunger extending outwardly of said plunger chamber, packing means disposed adjacent the lower end of the plunger chamber between the wall of said chamber and said end portion of said plunger, elongated structural supporting means secured at its lower end to said cylinder block and extending upwardly from said block in a position substantially coaxial with said plunger chamber, a stationary frame member secured to the upper end of said supporting means, driving means supported by said stationary member, a connecting member extending laterally of the lower end of said plunger, a floating driving connection between said connecting member and said lower end of said plunger providing relative lateral movement between them, elongated actuator means connected at one end to said connecting member and at the opposite end to said driving means, structure providing a floating driving connection between the upper end of said actuator means and said driving means for relative lateral movement between them whereby reciprocation of said plunger within said plunger chamber may be produced by forces alternately acting vertically upward and vertically downward, the relative lateral movements provided by said driving connections compensating for misalignment, thereby to minimize the development on said plunger of forces having lateral components of substantial magnitude, said cylinder block having in communication with the upper end of said plunger chamber a flow passage inclined upwardly from said upper end of said chamber, inlet means in flow communication with said passage and extending downwardly therefrom, and outlet means in flow communication with said passage and extending upwardly therefrom whereby liquid may be drawn upwardly through said inlet means for flow into said plunger chamber and then forced through said passage and said outlet means for delivery of a predetermined quantity of liquid from said plunger chamber upon completion of each upward movement of said plunger.

2. In a submersion pump of the controlled volume type adapted for operation below the level of a body of liquid, the combination of a cylinder block having a vertically extending plunger chamber, an elongated plunger disposed for reciprocation within said chamber, the lower end portion of said plunger extending outwardly of said plunger chamber, packing means disposed adjacent the lower end of the plunger chamber between the wall of said chamber and said end portion of said plunger, elongated structural supporting means secured at one end to said cylinder block and extending upwardly from said block in a position substantially coaxial with said plunger chamber, a stationary frame member secured to the upper end of said supporting means, driving means supported by said stationary member, a connecting member extending laterally of the lower end of said plunger, a floating driving connection between said connecting member and said lower end of said plunger providing relative lateral movement between them, elongated actuator means connected at one end to said connecting member and at the opposite end to said driving means, structure providing a floating driving connection between the upper end of said actuator means and said driving means for relative lateral movement between them whereby reciprocation of said plunger within said plunger chamber may be produced by forces alternately acting vertically upward and vertically downward, the relative lateral movements provided by said driving connections compensating for misalignment, thereby to minimize the development on said plunger of forces having lateral components of substantial magnitude, said cylinder block having in communication with the upper end of said plunger chamber a flow passage, inlet means in flow communication with said passage, and outlet means in flow communication with said passage and whereby liquid may be drawn through said inlet means for flow into said plunger chamber and then forced through said outlet means for discharge of liquid from said plunger chamber.

3. The combination of claim 2 in which said elongated structural supporting means comprises a solid structural member having a lower end portion of decreased diameter nesting within an opening provided in said cylinder block and in which the upper end thereof is secured to a cantilever support, said cantilever support comprising said stationary frame member.

4. The combination of claim 2 in which said connecting member extending laterally of the lower end of said plunger is counterbored to provide a flat lower surface therein, said counterbored portion being threaded, a threaded member extending into said counterbored portion of said laterally extending member, said lower end of said plunger having an enlarged end disposed between the opposed surfaces provided by said counterbored connecting member and said threaded member, said threaded member having an opening of somewhat larger diameter than said plunger to provide for said relative lateral movement between them.

5. In a submersion pump of the controlled volume type adapted for operation below the level of a body of liquid, the combination of a cylinder block having a vertically extending plunger chamber, an elongated plunger disposed for reciprocation within said chamber, the lower end portion of said plunger extending outwardly of said plunger chamber, packing means disposed adjacent the lower end of the plunger chamber between the wall of said chamber and said end portion of said plunger, a tubular housing secured at one end to said cylinder block and extending upwardly therefrom in position substantially coaxial with said plunger chamber, a stationary frame member secured to the upper end of said tubular housing, driving means supported by said stationary member, a connecting member extending laterally of the lower end of said plunger, a floating driving connection between said connecting member and said lower end of said plunger providing relative lateral movement between them, elongated actuator means including a plurality of rods connected at their lower ends to said connecting member, said rods extending into said housing, structure providing a floating driving connection between the upper end of said actuator means and said driving means for relative lateral movement between them whereby reciprocation of said plunger within said plunger chamber may be produced by forces alternately acting vertically upward and vertically downward, the relative lateral movement provided by said driving connections compensating for misalignment, thereby to minimize the development on said plunger of forces having lateral components of substantial magnitude, said cylinder block having guide openings for said rods and also having in communication with the upper end of said plunger chamber a flow passage inclined upwardly from said upper end of said chamber, inlet means in flow communication with said passage and extending downwardly therefrom, and outlet means in flow communication with said passage and extending upwardly therefrom whereby liquid may be drawn upwardly through said inlet means for flow into said plunger chamber and then forced through said passage and said outlet means for delivery of liquid from said plunger chamber.

References Cited in the file of this patent

UNITED STATES PATENTS

| | | |
|---|---|---|
| 1,208,259 | Winton | Dec. 12, 1916 |
| 2,151,067 | Andrew | Mar. 21, 1939 |
| 2,263,429 | Sheen | Nov. 18, 1941 |
| 2,596,943 | Sheen | May 13, 1952 |
| 2,633,085 | Hieger | Mar. 31, 1953 |